United States Patent
Denisenkov et al.

(10) Patent No.: US 8,692,900 B2
(45) Date of Patent: Apr. 8, 2014

(54) FRAME SELECTION TO PROVIDE FOR A ZERO SHUTTER LAG IN A DIGITAL CAMERA

(75) Inventors: Dmitry Denisenkov, Waterloo (CA); Gang Xue, Waterloo (CA); Sung Ho Hong, Waterloo (CA); Qian Wang, Waterloo (CA)

(73) Assignee: BlackBerry Limited, Waterloo (CA)

( * ) Notice: Subject to any disclaimer, the term of this patent is extended or adjusted under 35 U.S.C. 154(b) by 279 days.

(21) Appl. No.: 13/092,646

(22) Filed: Apr. 22, 2011

(65) Prior Publication Data

US 2012/0268624 A1  Oct. 25, 2012

(51) Int. Cl.
*H04N 5/235* (2006.01)
*H04N 5/228* (2006.01)
*H04N 5/222* (2006.01)

(52) U.S. Cl.
USPC .................................. 348/222.1; 348/333.11

(58) Field of Classification Search
None
See application file for complete search history.

(56) References Cited

U.S. PATENT DOCUMENTS

| 7,027,087 | B2 * | 4/2006 | Nozaki et al. | 348/231.99 |
| 7,982,770 | B1 * | 7/2011 | Kahn et al. | 348/208.1 |
| 2005/0243180 | A1 * | 11/2005 | Yokonuma | 348/222.1 |
| 2006/0055791 | A1 * | 3/2006 | Morino | 348/211.2 |
| 2006/0132623 | A1 * | 6/2006 | Nozaki et al. | 348/231.99 |
| 2006/0256396 | A1 * | 11/2006 | Ejima et al. | 358/448 |
| 2007/0177021 | A1 * | 8/2007 | Shan et al. | 348/208.12 |
| 2010/0309335 | A1 * | 12/2010 | Brunner et al. | 348/231.6 |

* cited by examiner

*Primary Examiner* — Sinh Tran
*Assistant Examiner* — Jason Flohre

(57) ABSTRACT

An apparatus, and an associated method, facilitates capturing an image in an electronic camera without having to wait for an image to settle or the camera to stabilize. Image frames are captured continuously. Data representing captured images is compressed. The compressed files are stored continuously, such that even before a shutter button is actuated, one or compressed image frames have already been recorded. When the shutter button is actuated, the largest of the compressed data files is selected for use, such as display, printing or transmission. Selection is made based on the size of the compressed image file.

18 Claims, 2 Drawing Sheets

FRAME SELECTION TO PROVIDE FOR A ZERO SHUTTER LAG IN A DIGITAL CAMERA

The present disclosure relates generally to a manner by which to facilitate photographic image recordation taken by a digital camera, such a digital camera incorporated into a wireless device. More particularly, the present disclosure relates to an apparatus, and an associated method, which can avoid or eliminate delay between when a user depresses a shutter button on his or her camera and when an image is actually captured.

BACKGROUND

Recent years have witnessed the development and deployment of a wide range of electronic devices and systems that provide many new functions and services. Advancements in communication technologies for instance, have permitted the development and deployment of a wide array of communication devices, equipment, and communication infrastructures. Such development, deployment, and popular use have changed the lives and daily habits of many.

Cellular telephone and other wireless communication systems have been developed and deployed and have achieved significant levels of usage. Increasing technological capabilities along with decreasing equipment and operational costs have permitted, by way of such wireless communication systems, increased communication capabilities to be provided at lowered costs.

Early-generation, wireless communication systems generally provided for voice communications and limited data communications. Successor-generation communication systems have provided increasingly data-intensive communication capabilities and services. New-generation communication system, for instance, provide for the communication of large data files at high through-put rates via attachment to data messages.

Wireless communications are typically effectuated through use of portable wireless devices, which are sometimes referred to as mobile stations. The wireless devices are typically of small dimensions, thereby to increase the likelihood that the device shall be hand-carried and available for use whenever needed as long as the wireless devices positioned within an area encompassed by a network of the cellular, or analogous, communication system. A wireless device includes transceiver circuitry to provide for radio communication, both to receive information and to send information.

Some wireless devices are now provided with additional functionality. Some of the additional functionality provided to a wireless device is communication-related while other functionality is related to other technologies. When so-configured, the wireless device forms a multi-functional device, having multiple functionalities.

A camera functionality that provides for the capture and recordation of a photographic image or a series of images is amongst the functionalities that are now sometimes provided to wireless devices. Because of the small dimensions of typical wireless devices, and the regular carriage of such devices by users, a wireless device having camera functionality is available to the user to record an image or series of images.

An image, once recorded can be saved, for example, at a storage element of the wireless device and/or can be transferred elsewhere because the recorded image is defined or kept as a file, which is generally considered to be a named or identified collection of information, such as a set of data bits or bytes used by a program. And, since the recorded image is kept as a file, the file can be appended to a data message and sent elsewhere. The data file forming the image or images is also storable at the wireless device, available subsequently to be viewed at the wireless device.

Camera functionality provided to a wireless device typically includes a camera lens that functions to focus a subject. Camera-capable wireless devices also include structures to form and permit saving of a captured image. In more sophisticated implementations, the camera lens is movable to provide for a change in the focal point of a camera image.

DETAILED DESCRIPTION

Figure 1:
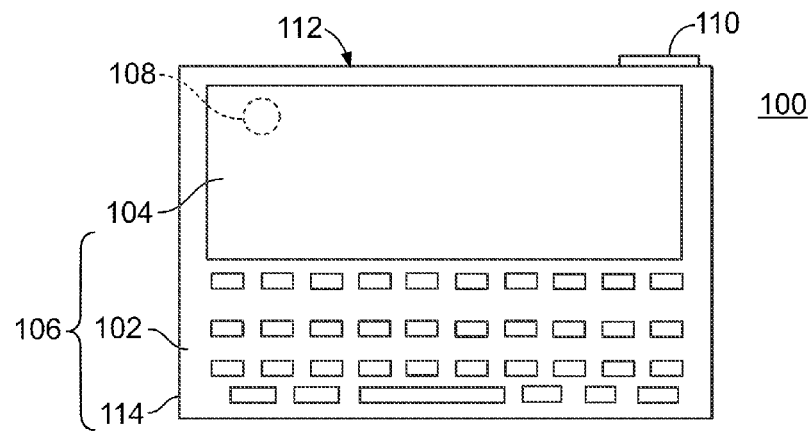
FIG. 1 is a front elevation view of a portable communications device.

FIG. 1 is a front elevation view of a portable communications device 100 configured to provide wireless two-way voice and data communications but to also provide photograph-taking, camera functionality. The device 100 is comprised of a conventional keyboard 102 that receives user input and a display device 104 on which text and graphics can be displayed. The display device 104 is preferably embodied as a plasma or liquid crystal panel on which text and graphics or images can be displayed. Together, the keyboard 102 and the display device 104 comprise a user interface 106.

Photographs can be taken through a lens 108 that extends through the backside surface of the device 100 by depressing (actuating) a momentary push button switch 110 located on the top surface 112 of the device 100. Images entering the lens 108 are displayed on the display device 104 prior to actuation of the push button 110. The display device 104 thus functions as a "view finder." The display device 104 also functions as a captured image display device. Detected images that are captured and processed as described below can also be displayed on the display device.

Figure 2:
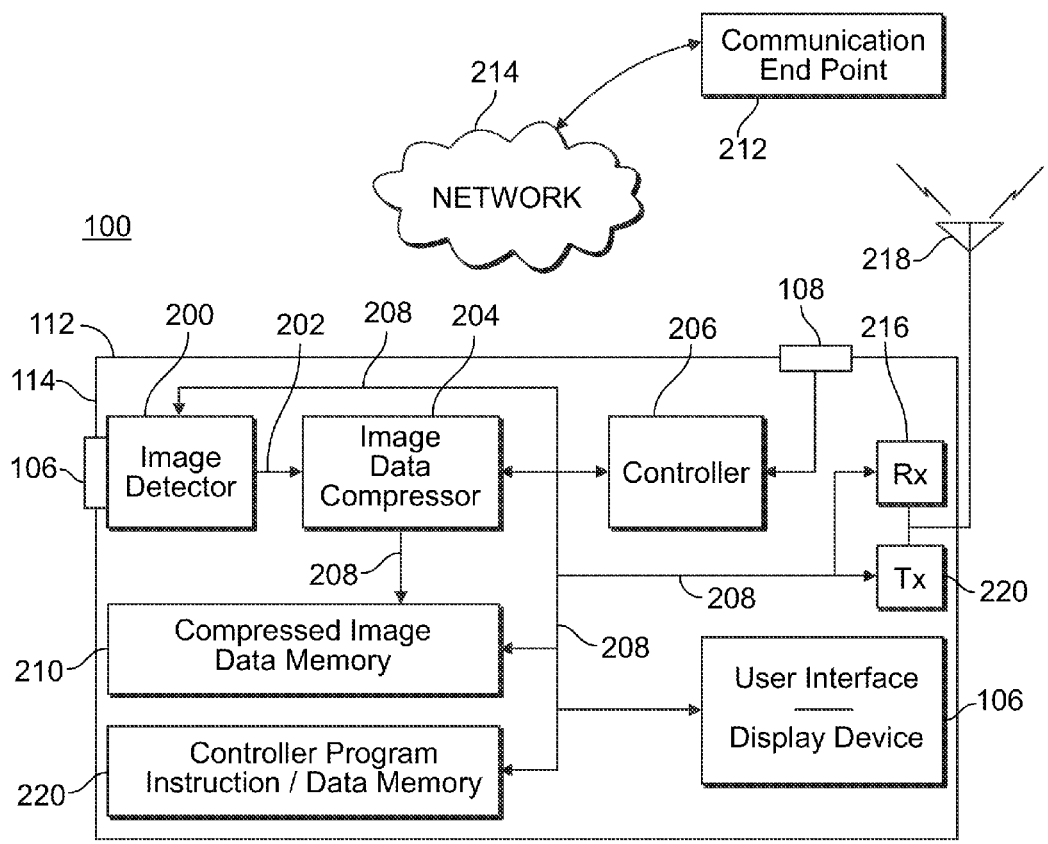
FIG. 2 is block diagram of the portable communications device depicted in FIG. 1.

FIG. 2 is a functional block diagram of the portable communications device. The lens 108, which is depicted in FIG. 1 as being located on the back side of the device 100, is depicted in FIG. 2 as being on the left side 114 for illustration purposes.

Regardless of where the lens 106 is positioned or located on the device 100, a conventional semiconductor image detector 200 is operationally coupled to the lens 106 so that light passing through the lends 106 impinges on a surface of the detector 200 configured with numerous individual light sensing elements. The image detector 200 is thus comprised of numerous discrete, light-sensitive areas or regions, each of which outputs a digital signal (data) representing light energy that impinges on it. Each of these regions or areas is small and commonly referred to in the art as a picture elements or pixel.

Existing image detectors are configured to have millions of pixels. The image detector 200 can thus output millions of bytes of digital data when it captures an image that impinges on it.

Images captured by the detector 200 are referred to herein as image frames. Existing semiconductor image detectors are able to capture images comprised of millions of pixels at rates that exceed sixty frames per second. It is therefore possible to capture a new image frame every 17 milliseconds, which is fast enough for the image detector 200 to "freeze" most of the relative motion of the detector 200 relative to an object being photographed.

Image frame data that is output from the detector 200 in response to the capture of an image is considered herein to be raw or unprocessed image frame data because the data output from the detector 200 is a digital representation of electrical signals generated by individual picture elements of the detector 200. Data from the detector 200 that represents a captured image can be stored, transmitted, received and manipulated as a unit. Such data is therefore considered herein to be a captured image data file.

Still referring to FIG. 2, raw, image frame data from the image detector 200 is coupled into an image data processor 204 via a bus 202 that extends therebetween. As used herein, the term "bus" refers to a set of parallel conductors in a computer system that forms a main transmission path. The image data compressor 204 converts image frame data into smaller, i.e., reduced-size files by compressing the image frame data that makes up an image frame data file. In an implementation, the image data compressor 204 compresses the raw image files using JPEG-3 compression methodology.

JPEG is an acronym for the Joint Photographic Experts Group. JPEG-compliant image data compression processes reduce the size of a raw, unprocessed image frame file by comparing adjacent pixels of a captured image to each other. Put succinctly, adjacent pixels that have the same or nearly the same value are "combined" into one value representing all of the adjacent pixels in a matrix of such similar pixels. The JPEG compression process converts multiple adjacent individual picture elements into a larger "pixel" which when used to re-create an image produces a reasonable facsimile of the originally-captured image. As a result of the JPEG conversion process, a captured image file having many similar pixels will be converted into a JPEG file that is much smaller than the JPEG file created by converting a captured image file having many dissimilar pixels. The size of a JPEG conversion thus indicates or corresponds to the granularity, quality or resolution of the image originally captured by the image detector 200.

Since JPEG conversions of captured image files are smaller in size than the original, captured image file, a JPEG file is thus considered herein to be reduced-size conversion of a captured image file. The file size reduction is due to the fact that the JPEG conversion process combines similar pixels in a matrix together. An image captured by the detector 200 that lacks definition or is blurry, or is out of focus will have a large number of adjacent pixels that are the same or nearly the color and contrast ratio. In such an image, pixels that are adjacent to each other and similar or identical can be represented together, as a group, using a smaller amount of data than would otherwise be required to represent all of the similar or identical pixels individually. The JPEG conversion of a captured image of an object that is blurred or out of focus file will thus be smaller than the JPEG conversion of a captured image of the same object that is sharply focused. The clarity or quality of a captured image of an object is thus indicated by the relative size of the JPEG-conversion of the original, captured image file of the object by the detector 200.

Raw image files produced by the image detector 200 may be optionally passed through an image data processor, which in this context refers to any microcontroller or microprocessor that continuously accepts raw images from the detector and which is able to perform one or more predefined operations or transformations on each image in a consistent fashion, producing modified raw images, which can then be sent to the image data compressor 204. Examples of such operations by an image data processor include, but are not limited to, cropping or resizing an original image from the image detector 200, adjusting color to improve image quality, and eliminating visual artifacts. By way of example, the image detector 200 might capture images at a resolution of 2560× 1920, but the input provided to the image data compressor 204 is only 1024×768 after it passes through croping/scaling processing performed by an image data processor.

Image data processing to crop or resize, adjust color or improve image quality are well known. Hardware devices and software methodologies to perform such functions are also known in the art. For brevity, the depiction of such hardware in FIG. 2 is omitted as is the description of how such processes are performed. In an implementation, a controller 206 such as a microcontroller or microprocessor, controls the electronic devices shown in FIG. 2. Microcontrollers and microprocessors are well known in the art. The controller 206 can alternatively be embodied as an application specific integrated circuit (ASIC), field-programmable gate array (FPGA) or a digital signal processor (DSP) so long as the device is able to effectuate control over image capture, the processing of captured image frame data into compressed files, selection of a compressed image data file based on the size and the display of an image on a display device using a selected compressed image data file.

In order to be able to capture an image with zero or near-zero shutter lag, and without blurring or distortion, the image detector 200 continuously captures images and continuously generates captured image data files, as soon as the camera mode of a communications device is activated. The continuously-generated captured image data files are thus continuously provided to the image data processor 204, which continuously converts image frame data files into smaller, i.e., reduced-size image data files.

The image data memory 210 can be implemented as a circular data memory buffer, which can be implemented as either a single contiguous block of memory or as a collection of memory blocks but which are always written to in the same sequence. When the image data compressor 204 writes JPEG-compressed (or any second-format, variable-size) image files sequentially to the image data memory/circular buffer 210, a notification is provided to the controller 206 by the image data compressor 204 indicating the location and size of the newly recorded image in the image data memory 210. The location and size data are then recorded by the controller 206 into a list data structure, the physical location of which is a design choice, but which keeps track of the location and size data for a number of the most recently received frames. In an implementation, between one and up to either a fixed maximum (e.g. 5), or the maximum number of frames that may physically fit into the circular data buffer (the latter may vary during the runtime of the camera are stored, depending on the actually size of the JPEG/second-format frames). The data in the aforementioned list are then used to identify which frame is largest and thus decide which frame to retrieve, and to also locate the desired frame in the circular data buffer memory 210 at a later time.

Every captured image frame is added onto a list data structure or frame queue in chronological order. After a certain number of image frames have been stored or the memory device 210, the oldest image frame in the memory device 201 is effectively removed by being over-written by the next-oldest image frame file. The new or most-recently-captured image data files are thus assured of being stored after being compressed. In an implementation, five (5) temporally-consecutive frames are stored in the compressed image data memory 210. The image data memory 210 thus stores JPEG conversions of the five most recently captured image frames.

A limited number of image frames are converted and stored in order to be able to capture the image that was detected immediately prior to actuation of a picture capture switch 108. When a user wants to take a picture using the camera functionality, i.e., capture an image, the user actuates the picture capture switch 108. Picture capture switch 108 actuation can be detected by the controller 206 using techniques and methods well known in the art and therefore omitted for brevity. Actuation of the picture capture switch 108 signals the controller 206 to record or mark the most recently captured and processed, image data files for possible future use and/or transmission. Releasing the picture capture switch 108 signals the controller 206 to select the "best" of the five recently captured image files. The largest file in the collection of files stored in the compressed image data memory 210 is considered to be the one file that will render the best image on a display device for reasons that are set forth above.

The reduced-size image frame data files output 208 from the image data compressor 204 are stored in chronological order in the compressed image data memory device 210. Memory locations where the compressed image files are stored can reside on a single silicon die or can be on multiple die.

In an implementation, the detection, compression and storage operations are repeated as described above until the picture capture switch 108 is actuated by the user. When the button is released, the controller 206 evaluates the size of the compressed image data files stored in the compressed image data memory device 210 and selects the largest-size file to use to create an image on the display device 104. The largest file is likely to be the file that will produce the highest-quality facsimile of the original image captured by the image detector 200 due to how the JPEG conversion process operates. The controller 206 thus selects for display on a user interface device 102, printing or transmission, the largest file in the compressed image data memory 210.

By capturing and generating image frames continuously immediately before a picture capture button 108 is actuated, the camera mechanism captures a series of images of objects prior to the physical movement of the camera that is inherently caused by actuating a pushbutton. The number of frames that are captured and kept in the compressed image data memory 210 is a design choice, limited by the size of the memory device and the time required to capture and process each raw, captured image data file. In an implementation, only two reduced-size image data files were stored in the compressed image data memory device 200. In other implementations, five, ten or more reduced-size image data files can be stored. Unlike prior art digital cameras that require a delay or wait time for an image to stabilize before capturing it, there is little or no "shutter lag" between the time that a shutter button is actuated and a usable picture captured because images are captured before the shutter button is depressed.

While one implementation has a controller 206 configured to store the reduced-size image frame files in chronological order, in another implementation a controller 206 is configured to sort and store the reduced-size image frame files order of file size. By way of example, two successive reduced-size image frame files can be ordered in the memory device 210 according to file size by storing the first file in the memory device 210. Before storing the second file, the sizes of the two files are compared to each other. Of the two files, the smaller file can be stored in a memory range that is either lower or higher in addressable memory than the larger file.

In another implementation, the controller 206 is configured to select more than just the single largest file to use to create an image on the display 104. A smaller number of the largest reduced-size image frame files stored in the memory device 210 are selectively displayed in turn, responsive to momentary actuation of the picture capture switch 108 or, responsive to a second input key, such as one or more keys on the keyboard 102. A user of the device 100 can thus select a particular file to use rather than having the controller 206 make the selection for the user.

FIG. 2 shows that the device 100 is equipped with a radio frequency receiver 216, a radio frequency transmitter 220 and an antenna 220. The receiver 216 and the transmitter 220 are coupling to the controller 206 via the aforementioned bus 208. After a reduced-size image frame data file has been selected by the controller 206 or by a user of the device, the user of the device can optionally transmit the selected file to a communication endpoint 212 via a communication network 214.

The image data compressor 204 is preferably embodied as the controller 206 and computer program instructions that it executes. In another implementation, the image data processor 204 can be implemented using an application specific circuit (ASIC), a field programmable gate array (FPGA) or conventional sequential and combination logic circuits.

Computer program instructions that are executed by the controller 206 and which enable the controller 206 to provide the functionality described above are stored in a controller program instruction data memory device 220. The controller program instruction memory device 220 can be the same semiconductor die that provides the compressed image data memory 210. It is preferably one or more separate semiconductor die. Regardless of how the memory devices are provided or configured, the devices are coupled to the controller 206 via the same bus 208 mentioned above.

Figure 3:
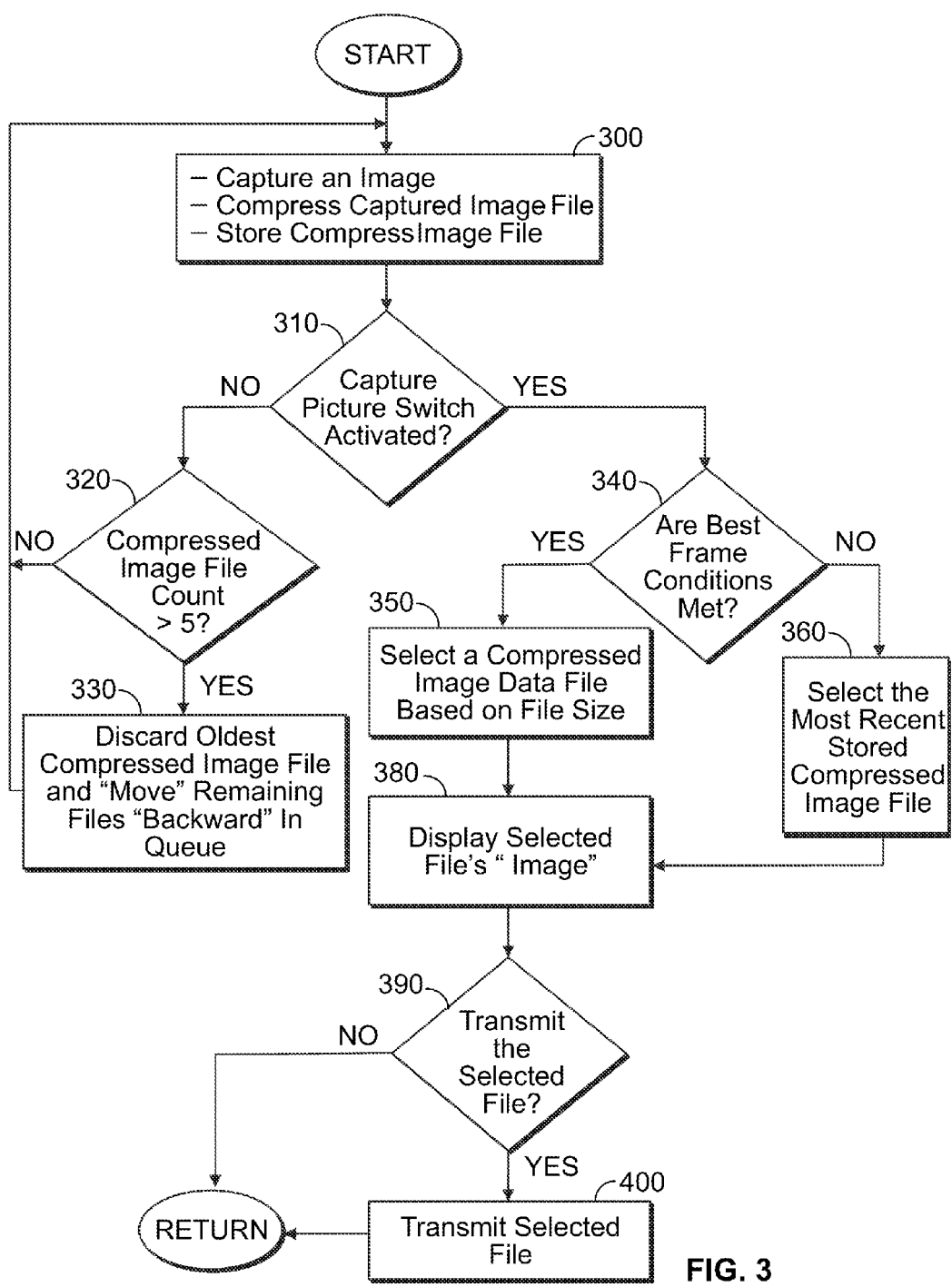
FIG. 3 is a depiction of a method practiced by the portable communications device.

The nature of the computer program by which the zero or near-zero shutter lag effectuated by the method and apparatus described above is illustrated in FIG. 3, which is a flowchart depicting steps of the method for selectively displaying on a display device one of many captured images. In FIG. 3, steps 300, 310, 320 and 330 comprise a loop, in which the camera continuously captures images, processes the images and stores the images as described above.

At step 300, an image is captured, compressed and stored in a memory device. Step 300 thus actually depicts three separate processes for purposes of brevity.

Step 310 indicates a test of whether a command to capture an image was detected or received. Such a command would be the result of a user actuating the picture capture switch. If no picture capture switch actuation occurred, at step 320 a test is executed to determine how many compressed image data files have been stored. In one implementation, only the five most recent compressed image data files are stored. If after processing an image data file, five reduced-size image data files are determined at step 320 to have already been stored in the memory device 210, the oldest frame in the memory device 210 is discarded at step 330 to make room in the memory device 210 for the most recently-processed reduced-size image data file.

As FIG. 3 is drawn, it implies that step 310 will not occur until after step 300 is concluded. In an actual camera, a picture capture switch actuation can occur at any time. It is therefore important for the camera apparatus depicted in FIGS. 1 and 2 and the method depicted in FIG. 3 to respond to a picture capture switch actuation whenever it might occur. Therefore, when a picture capture switch actuation occurs, the largest-size file resident in the memory device 210 is selected, regardless of how many files might be available to select from, even if there is only one or two such files in the memory device 210. Stated another way, the method depicted in FIG. 3 does not need to have five reduced-size image data files to select from.

When the shutter or picture capture switch 108 is detected as having been actuated, the test performed at step 310 causes the method to proceeds to step 340 whereat the controller 206 determines whether it is appropriate to use the best frame selection methodology. This decision is made based on the environmental conditions determined by the image detector (200), image data processor, and the controller (206).

The environmental conditions unsuitable for the largest-frame selection method may include, but are not limited to low ambient light, any situation where the detector 200, IDP, or controller 206 determines that a flash should be used, any situation where a camera is configured for fixed low integration (or exposure) time (e.g. "sports mode") or a situation where the image detector 200 is operating with too high a gain If for instance ambient light is low, or if the camera is set to operate in a high-speed shutter "sport mode" or if the image detector 200 is operating with too high of a gain, step 340 provides an optional branch around the largest-file selection step 350. At step 360, the chronologically latest reduced-size image data file is selected for subsequent use in step 380.

At step 380, the selected file can be displayed on the display device 104 or printed. A user of the communications device can make a decision at step 390 whether to transmit the selected image. Regardless of whether the image is transmitted, program control returns to step 300 where the steps of capturing/compressing/storing are repeated for as long as the communications device is operated in the camera mode.

As stated above, the conversion performed as part of step 300 is to convert raw picture element image data files to smaller, reduced-size image data files using a JPEG compression process. JPEG and JPEG-compliant processes are well-known as generating a second or reduced-type of image data file, the size of which corresponds to differences between adjacent picture elements (pixel) in the image that was originally captured by the image detector 200. For a succession of images that are captured in a few hundred milliseconds following a picture capture switch 108 actuation, larger-sized JPEG files will render better quality images on a display device or by printing than will smaller-sized files.

Those of ordinary skill in the art will recognize the ease of modifying the capture/process/store steps to increase or decrease the number of reduced-size image data files that are kept in memory. Those of ordinary skill will also recognize that compression processes other than JPEG-compliant processes can also be used to process raw image data files so long as the result of the conversion provides a file size reflective of the number of pixels in an original image data file, that are different from each other in some way. The capture/process/store steps can also be temporarily suspended by the user or the controller 206 under at least two different picture-taking conditions.

When the camera is used in an action-shot or "sport mode" and picture timing is critical, selecting a reduced-size image file that is not a conversion of the most recently-captured image can result in the controller 206 selecting a reduced-size image file that is missing what a photographer wanted to capture. And, when the camera is used with low or dim ambient light, images captured by the image detector 200 will tend to have a large amount of visual noise caused in part by an increased gain of the image detector.

The method and apparatus described above can find use in any digital camera, regardless of whether the camera is included in a portable communications device. The foregoing description is therefore for purposes of illustration. The true scope of the disclosure is set forth in the appurtenant claims.

What is claimed is:

1. A camera comprising:
    a camera picture capture switch;
    an image detector configured to, prior to actuation of the camera picture capture switch, continuously capture image frames and generate data representing each captured image frame;
    an image frame data converter coupled to the image detector and configured to, prior to and during actuation of the camera picture capture switch, convert data representing each captured image frame of a sequence into a corresponding, reduced-size image frame data file using an image frame data conversion process;
    a reduced-size image frame data file selector configured to determine, after actuation of the camera picture capture switch, if at least one best frames condition is met, and in response to the at least one best frames condition being met, to select a plurality of largest reduced-size image frame data files from a plurality of stored reduced-size image frame data files into which the image frame data converter converts the data representing captured image frames, the selected plurality of largest reduced-size image frame data files being fewer than the plurality of stored reduced-size image frame data files of the sequence for use by the camera to generate a plurality of facsimiles of a corresponding captured image; and,
    a display device coupled to at least one of the image frame data converter and the image detector, the display device configured to selectively display a plurality of images for selection, each image constructed from data obtained from one of the plurality of facsimiles of a corresponding captured image.

2. The camera of claim 1, further comprising:
    a memory device coupled to at least one of the image detector, image frame data converter, display device and reduced-size image frame data file selector, the memory device being configured to store a plurality of reduced-size image frame data files.

3. The camera of claim 2, wherein the memory device is configured to store a plurality of reduced-size image frame data files in chronological order, the reduced-size image frame data files being stored in the memory device prior to actuation of the camera picture capture switch and until the picture capture switch is actuated.

4. The camera of claim 1, wherein the image frame data converter is configured to convert raw picture element image data, to a reduced-size image frame data file using a data conversion process that generates a second-type image frame data file having a file size measured in a number of data bytes, the number of data bytes in the second-type image frame data file corresponding to differences between adjacent picture elements in the image frame captured by the image detector.

5. The camera of claim 4, wherein the image frame data converter is configured to convert raw picture element data into a reduced-size image frame data file using a Joint Photographic Experts Group (JPEG)-compliant image data compression process.

6. The camera of claim 1, wherein the reduced-size image frame data file selector is optionally configurable to determine whether to select the plurality of largest reduced-size image frame data file from the plurality of stored reduced-size image frame data files, or alternatively select a plurality of chronologically latest reduced-size image frame data files.

7. A method of selectively displaying a captured image on a display device, the method comprised of:

sequentially capturing, prior to and during a picture capture switch actuation, each of a sequence of a plurality of image frames on an image detector;

for each of the captured plurality of image frames, generating a first-type of image data file;

converting each first-type image data file into a second-type reduced-size, image data file to generate a plurality of second-type reduced-size image data files; and after a picture capture switch actuation occurs, determining if at least one best frames condition is met, and, in response to the at least one best frames condition being met, comparing the size of each of the plurality of second-type image data files after being stored in a memory device and, selecting a plurality of largest files to produce a plurality of facsimiles of the corresponding plurality of image frames, the selected plurality of the largest files being fewer than the plurality of second type image files of the sequence; and, selectively displaying each of the plurality of facsimiles and providing for selection of one of the facsimiles as the captured image.

8. The method of claim 7, wherein a first-type image data file is comprised of a plurality picture elements and wherein the converting step is comprised of converting raw picture element image data, to a reduced-size image data file using a conversion process that generates a second-type image data file having a file size measured in a number of data bytes, the number of data bytes in the second-type image data file corresponding to differences between picture elements in the first-type image data file that are adjacent to each other.

9. The method of claim 7, wherein the step of selectively displaying each of the plurality of facsimiles comprises:

displaying an image using the selected second-type image file of each of the selected plurality of largest files.

10. The method of claim 8, wherein the image data conversion process is comprised of compressing raw picture element image data, using a Joint Photographic Experts Group (JPEG)-compliant image data compression process.

11. The method of claim 7 further comprising the step of:
storing each second-type image data file in a memory device prior to the picture capture switch actuation step.

12. The method of claim 11, wherein the storing step is comprised of:
storing each second-type image data file is a memory device configured to operate as a circular buffer.

13. The method of claim 7, wherein the step of selecting at least one of the first and second, second-type image data files further comprises:
in response to the at least one best frames condition not being met, selecting a most recently stored compressed image file of the first and second type image data files to produce a facsimile of a corresponding captured image.

14. A portable communications device comprising:
a processor;
an image detector coupled to the processor;
a display device coupled to the processor;
a picture capture switch;
a first memory device coupled to the processor and having executable instructions, which when executed cause the processor to:
continuously capture a sequence of image frames on the image detector, prior to and during actuation of the picture capture switch, the captured image frames being similar to each other;
for each captured image frame, generate a first-type of image data file representing the captured image;
convert each first-type image data file into a reduced size, second-type image data file, thereby producing a plurality of reduced size, second-type image data files, data in each of the second-type image data files representing a facsimile of a corresponding captured image frame; and
after actuation of the picture capture switch, determine if at least one best frames condition is met and, if the at least one best frames condition is met, select a plurality of the largest second-type image data files to use to generate a plurality of facsimiles of the corresponding captured image, the plurality of the largest second-type image data files fewer than the second-type image data files of the sequence;
selectively display each of the plurality of facsimiles for selection, and,
receive a selection of one of the plurality of facsimiles as a chosen captured image.

15. The portable communications device of claim 14, further comprised of:
a second memory device coupled to the processor, and
wherein the first memory device is additionally comprised of instructions which when executed cause the processor to:
store in the second memory device, second-type image frame data files prior to picture capture switch actuation.

16. The portable communications device of claim 14, wherein the first memory device is additionally comprised of program instructions, which when executed cause the processor to convert each first-type image data file into a reduced size, second-type image data file, using a conversion process that generates a second-type image data file having a file size measured in a number of data bytes, the number of data bytes in the second-type image data file corresponding to differences between picture elements in the first image frame, that are physically adjacent to each other on the image detector.

17. The portable communications device of claim 16, wherein the conversion process is configured to be a JPEG-compliant data compression process.

18. The portable communications device of claim 15, additionally comprising:
a radio frequency transceiver coupled to the processor and configured to transmit the selected, second-type image data file.

* * * * *